(12) United States Patent
Celepcikay et al.

(10) Patent No.: US 10,914,858 B2
(45) Date of Patent: *Feb. 9, 2021

(54) DIP CORRECTION FOR ARRAY INDUCTION TOOL DATA

(71) Applicant: Halliburton Energy Services, Inc., Houston, TX (US)

(72) Inventors: Ferhat Turker Celepcikay, Richmond, TX (US); Luis San Martin, Houston, TX (US); Burkay Donderici, Houston, TX (US); Dagang Wu, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 345 days.

This patent is subject to a terminal disclaimer.

(21) Appl. No.: 14/767,261

(22) PCT Filed: Mar. 15, 2013

(86) PCT No.: PCT/US2013/032365
§ 371 (c)(1),
(2) Date: Aug. 11, 2015

(87) PCT Pub. No.: WO2014/143015
PCT Pub. Date: Sep. 18, 2014

(65) Prior Publication Data
US 2016/0003964 A1 Jan. 7, 2016

(51) Int. Cl.
*G01V 3/38* (2006.01)
*G01V 3/28* (2006.01)

(52) U.S. Cl.
CPC . *G01V 3/38* (2013.01); *G01V 3/28* (2013.01)

(58) Field of Classification Search
CPC .................................................. G01V 3/38
See application file for complete search history.

(56) References Cited

U.S. PATENT DOCUMENTS 5,184,079 A    2/1993  Barber
5,867,806 A *  2/1999  Strickland ................ G01V 3/38
                                                      702/7
(Continued)

FOREIGN PATENT DOCUMENTS

WO    WO 2014/036509 A1    3/2013

OTHER PUBLICATIONS

Examination Report issued for GC 2014-26763 dated Mar. 28, 2017, 4 pages.
(Continued)

*Primary Examiner* — Hyun D Park
(74) *Attorney, Agent, or Firm* — Haynes and Boone, LLP

(57) ABSTRACT

A system and method of correcting induction logging data for relative dip, wherein an induction logging tool is utilized to collect initial induction logging data at a plurality of frequencies. The initial induction logging data is then corrected for skin effect and borehole effect, after which, inversion is performed on the processed induction logging data to determine a dip effect correction. The dip effect correction is then applied to the initial induction logging data in order to yield induction logging data that is dip corrected to reflect a zero relative dip. Once dip corrected, the induction logging data can be used with resistivity methodologies generally designed for instances where no dip is present in the formation under analysis. In certain embodiments, the inversion step utilizes an additive correction for the dip effect correction.

15 Claims, 13 Drawing Sheets

(56) References Cited

U.S. PATENT DOCUMENTS

| | | | |
|---|---|---|---|
| 5,884,227 A | 3/1999 | Rabinovich et al. | |
| 5,955,884 A * | 9/1999 | Payton | G01V 3/26 |
| | | | 324/339 |
| 2001/0039477 A1 | 11/2001 | Xiao et al. | |
| 2002/0186013 A1 | 12/2002 | Tabarovsky et al. | |
| 2003/0004647 A1 | 1/2003 | Sinclair | |
| 2004/0088114 A1* | 5/2004 | Xiao | G01V 3/28 |
| | | | 702/7 |
| 2008/0224706 A1* | 9/2008 | Rabinovich | G01V 3/28 |
| | | | 324/333 |
| 2013/0046474 A1* | 2/2013 | Bittar | G01V 3/10 |
| | | | 702/7 |

OTHER PUBLICATIONS

International Search Authority, International Search Report and Written Opinion, dated May 31, 2013, 11 Pages, United States Patent and Trademark Office.

* cited by examiner

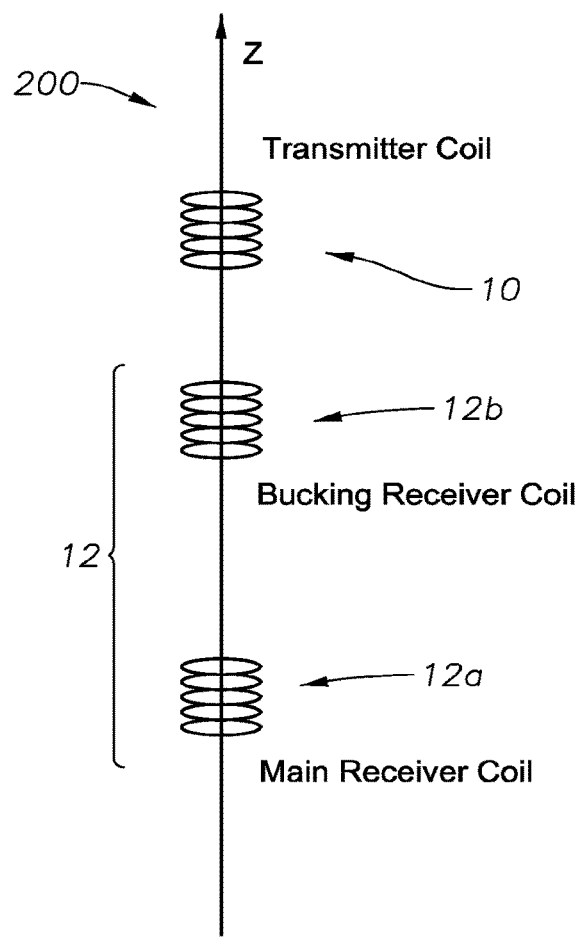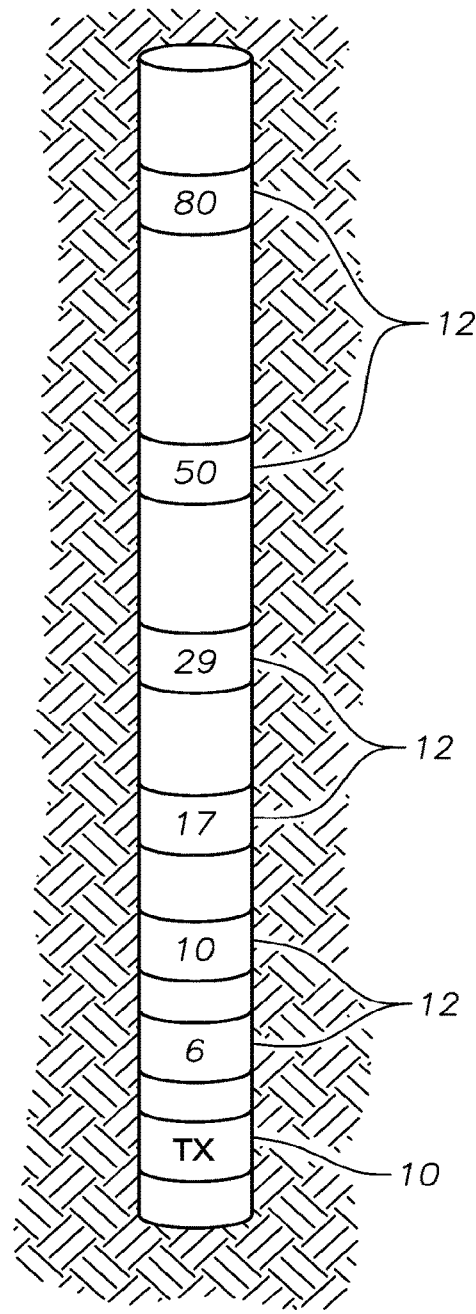
FIG. 1a
FIG. 1b

DIP CORRECTION FOR ARRAY INDUCTION TOOL DATA

CROSS REFERENCE TO RELATED APPLICATIONS

The present application is a U.S. National Stage patent application of International Patent Application No. PCT/US2013/032365, filed on 15 Mar. 2013, the benefit of which is claimed and the disclosure of which is incorporated herein by reference in its entirety.

FIELD

The present disclosure relates generally to a method and apparatus for evaluating the resistivity of a borehole using a multi-array induction tool, and more particularly, to a method and apparatus for evaluating the resistivity of formations with high relative dip angles or deviated wellbores utilizing conventional vertical resistivity evaluation techniques.

BACKGROUND

Induction logging tools are used in formation evaluation to measure the conductivity or its inverse, the resistivity, of a formation by employing alternating currents to set up an alternating magnetic field in the surrounding conductive formation.

Because the output signal from the induction logging tool is not itself an absolute measure of true formation conductivity in the vicinity of the sensors, but a weighted average of formation conductivities in multiple layers around the tool and also of the borehole, the output signal must be processed to obtain a log or plot of the true formation conductivity as a function of axial depth in the borehole.

In boreholes that are highly deviated, or in formations with high relative dip angle, the output signal data, and hence the log, may be complicated by the large formation volume of investigation of the logging tool. Typically, in vertical boreholes with little or no relative dip angle, a signal and response may be concentrated in a single formation layer. When the borehole is deviated, or when a bed exhibits relative dip with respect to the primary axis of the borehole, the signal and response may propagate through multiple layers and across multiple boundaries, resulting in a relative dip angle log that blends adjacent layers, and hence, a resistivity measurement that is a blending of the adjacent layers. The effect of relative dip on the induction log may make beds appear thicker, create separation of different sensor arrays and also create gradual changes near the boundaries. Moreover, it is known that thin beds are more affected by relative dip than thick beds, and resistive beds are more affected by relative dip than conductive beds.

Relative dip correction algorithms for array induction data have been implemented to remove the effect of relative dip in the response of the array induction tool. In such algorithms, removing the effect of the relative dip results in a log that is equivalent to that of a well path that is normal to the boundaries it traverses. Various methods are known in the art to remove the effect of relative dip from array induction data. Most of these methods rely on inversion or filtering algorithms that are based on processing of individual frequencies.

Moreover, one problem which limits the ability of induction logging tools to accurately obtain a measure of the true conductivity of the formations over a wide dynamic range is due to the skin effect phenomenon. This problem is characterized by non-linear changes in the profile of the tool response function as a function of formation conductivity, thereby producing non-linear variation in the output signal of the tool. The skin effect phenomenon has been described as that error signal which degrades the in-phase component measurement of the conductivity to produce an incorrect value. This skin effect phenomenon results primarily from the mutual interaction with one another of different portions of the secondary current flow in the formation material. The magnitude of this skin effect phenomenon also increases as the system operating frequency increases. Typically, skin effect correction (SEC) processes are applied to array induction data following dip correction as discussed above, and as such, skin effects are reflected in the dip corrected array induction data.

Likewise, the presence of a borehole strongly affects multi-component induction measurements in both water-based and oil-based mud borehole environments because a magnetic dipole source perpendicular to the borehole axis will induce significant axial electric currents in a conductive bore fluid. The borehole effects on the transverse couplings of multi-component induction logging tools are much greater than those that occur during conventional array induction logging. Consequently, the raw multi-component induction log data must be corrected for these effects before they can be applied to determine all of the formation properties previously described. As with skin effects, borehole effect correction (BHC) processes are typically applied to array induction data following dip correction, and as such, borehole effects are reflected in the dip corrected array induction data.

BRIEF DESCRIPTION OF THE FIGURES

A more complete understanding of the present disclosure and advantages thereof may be acquired by referring to the following description taken in conjunction with the accompanying figures, wherein:

FIG. 1a is a schematic representation of a typical array induction logging tool.

FIG. 1b is an illustration of spacing for an array in an induction logging tool.

DETAILED DESCRIPTION

Figure 2A:
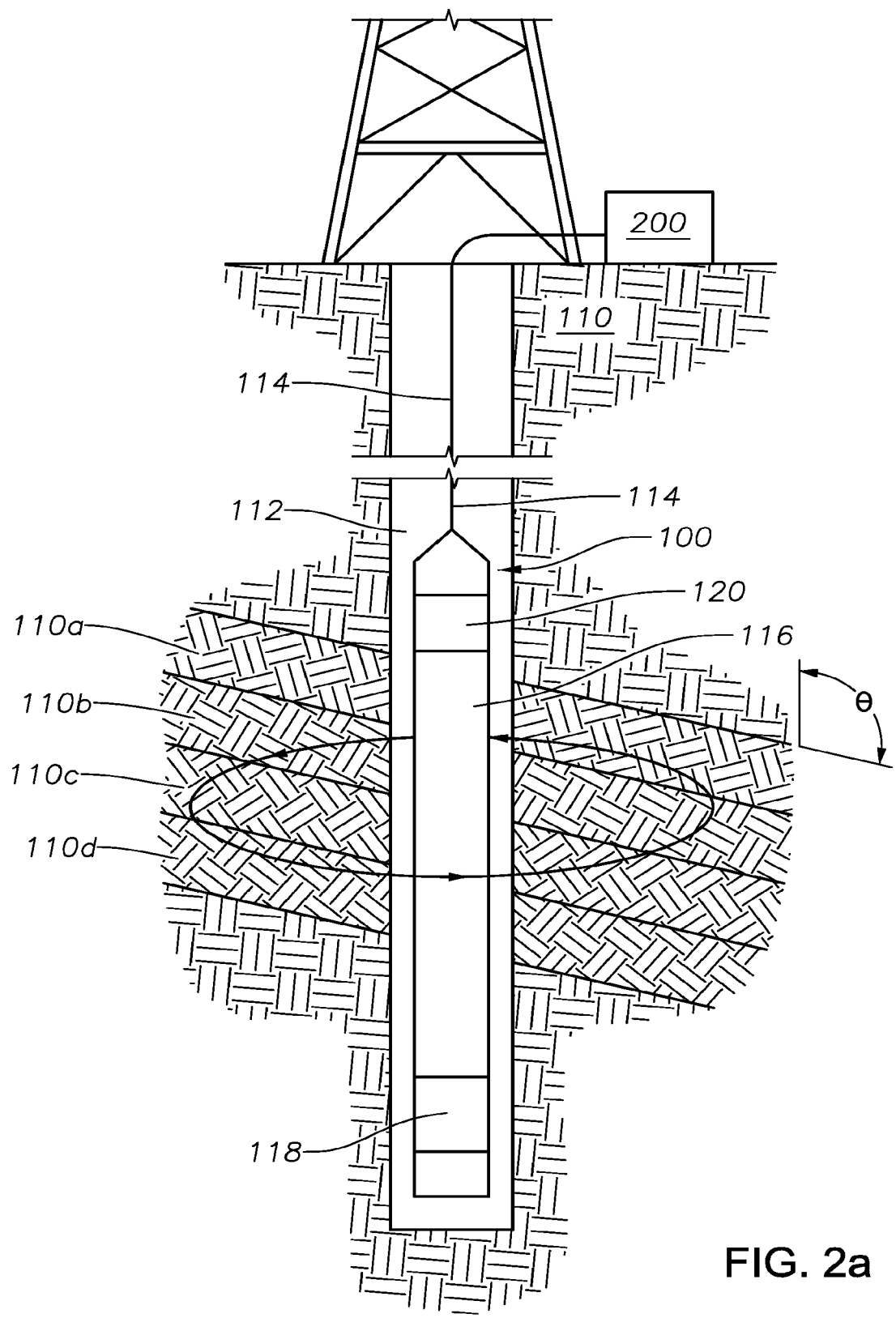
FIG. 2a illustrates a cross-sectional view of an induction logging tool deployed on a wireline in a formation having wellbore passing through multiple formation layers characterized by a relative dip.

In the method and system disclosed herein, a dip correction is applied to induction data obtained from an induction logging tool, and more specifically, from an array of receivers that comprise the tool, which tool generates an electromagnetic signal (and hence eddy currents) at a plurality of frequencies. The method disclosed herein combines information from a plurality of different frequencies in determining the dip corrections. In certain embodiments disclosed herein, skin effect correction (SEC) can be used prior to determination of the dip correction. In any event, the dip correction method uses borehole corrected (BHC) data to solve for a 1D formation geometrical model by way of mathematical inversion of the formation parameters. The use of borehole corrected data in the inversion process helps improve the quality of the inversion over a wider resistivity range. This is particularly true in embodiments where the data has also been corrected for skin and other effects. The resulting output of the dip correction process yields a dip corrected log that is equivalent to a log with zero degree relative dip, i.e., the borehole is perpendicular to the formation layers. This in turn, allows standard conductivity analysis based on zero relative dip to subsequently be utilized to interpret the induction data.

With reference to FIG. 1a, a typical array induction logging tool consists of a transmitter coil 10 oriented along the z-direction and a number of receiver coils 12 with the same orientation. The receiver coils 12 are used to collect the electromagnetic signal from the surrounding formation which is excited by the transmitter coil 10. In a traditional induction logging tool, in order to remove the signal that propagates directly from the transmitter to the receivers, and to obtain a better measurement of the formation response, the receiver 12 is made of two functional parts, a main receiver coil 12a and a bucking receiver coil 12b, referred to as "main" and "bucking" receiver coils. Commonly, such induction logging tools will have a plurality of receivers 12 disposed along the length of the tool so as to form a receiver "array." As illustrated in FIG. 1b, in an exemplary array, receivers 12 may be spaced apart from the transmitter coil 10 approximately 6 inches, 10 inches, 17 inches, 29 inches, 50 inches and 80 inches. The reference to inches refers to the distance between the transmitter coil and the main receiver coil of a receiver. However, since each particular receiver coil has a corresponding bucking coil for canceling out the mutual inductance between the transmitter coil and the particular receiver coil, the distance identifier for the receiver coil is also retained for its corresponding bucking coil.

Figure 2B:
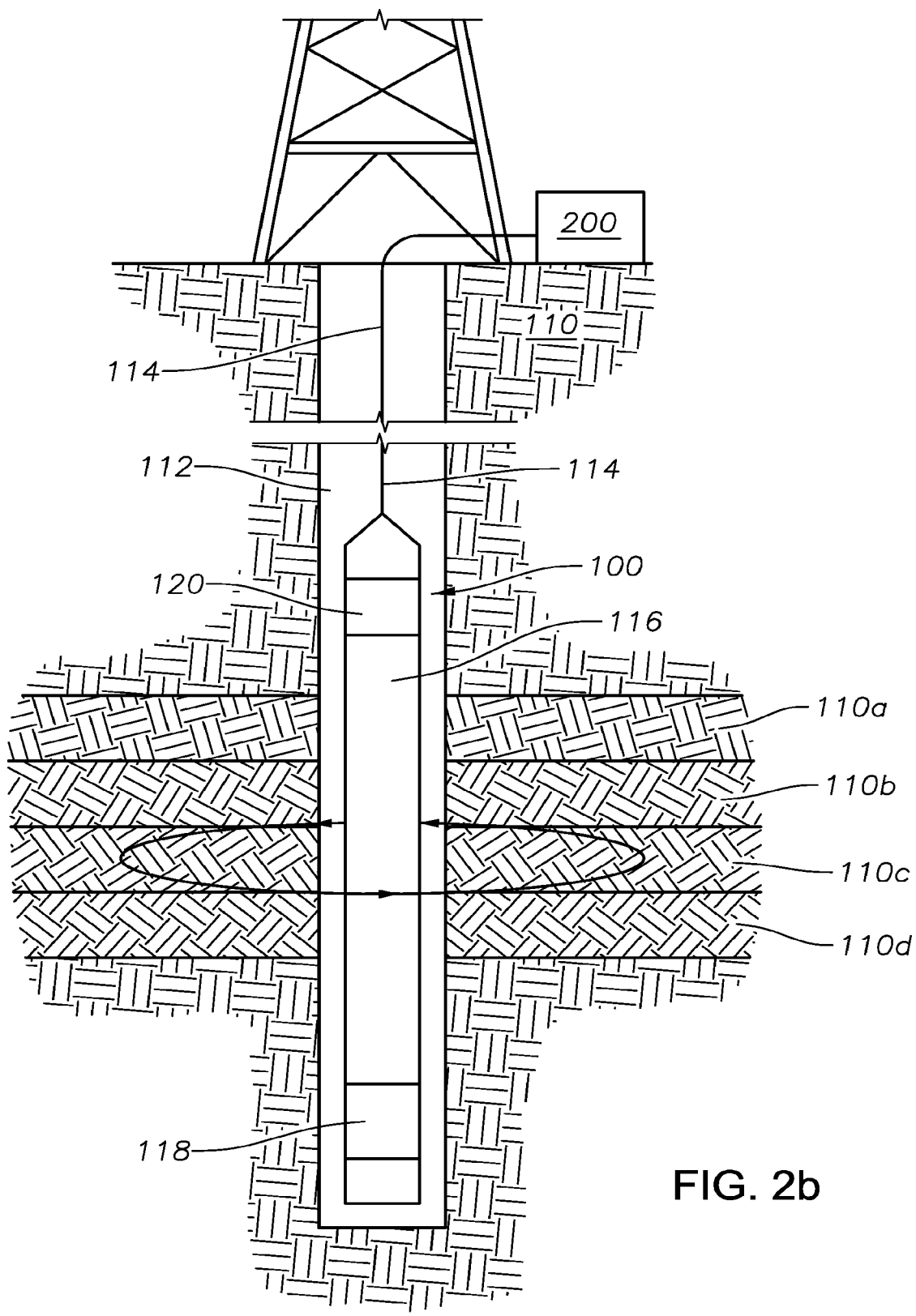
FIG. 2b illustrates a cross-sectional view of an induction logging tool deployed on a wireline in a formation having wellbore passing through multiple formation layers with no relative dip.
Figure 2C:
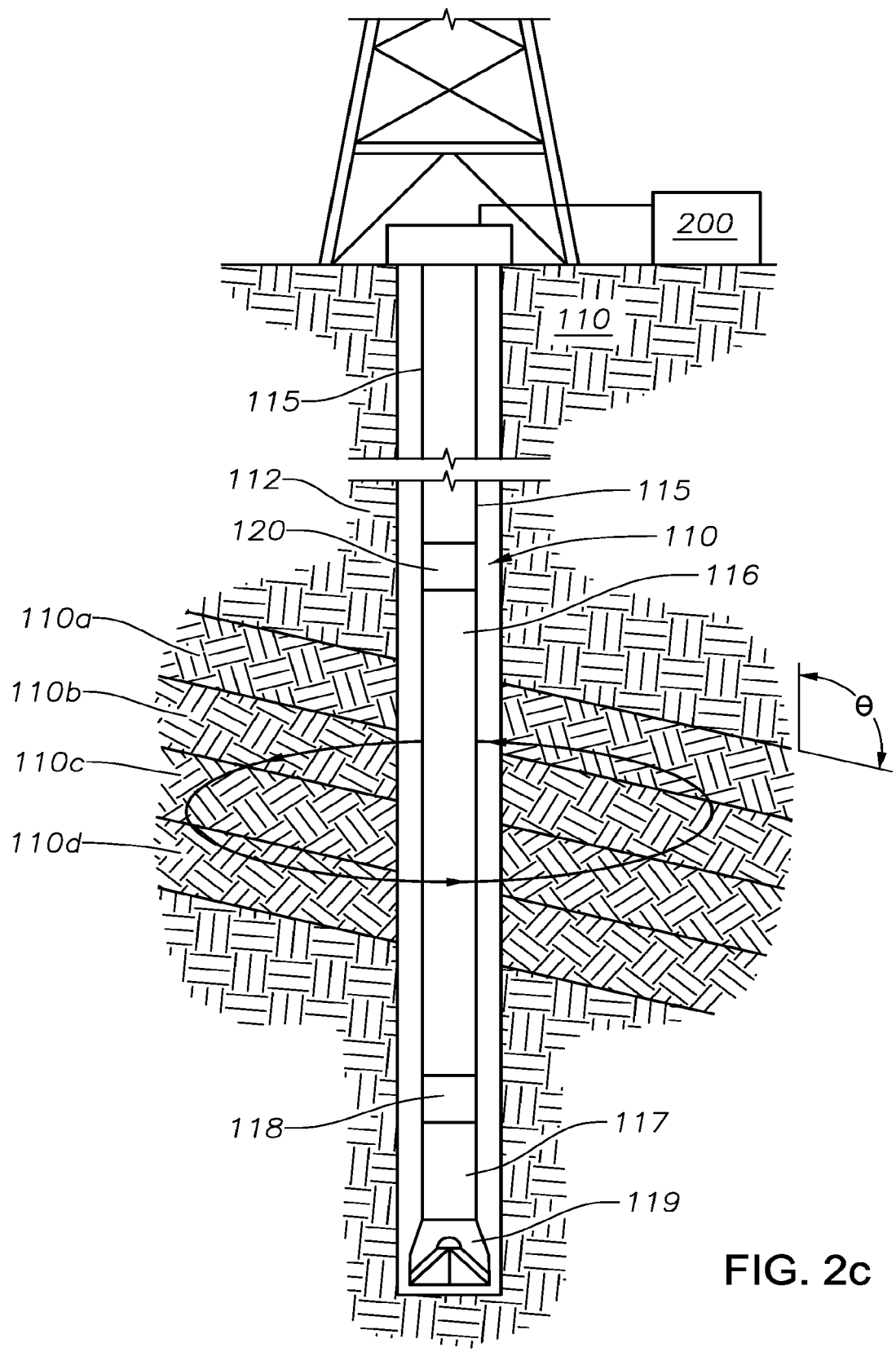
FIG. 2c illustrates a cross-sectional view of an induction logging tool deployed on a drillstring in a formation having wellbore passing through multiple formation layers characterized by a relative dip.

Referring to FIGS. 2a and 2b, an induction logging system is illustrated. The system includes an induction tool 100 disposed in an earth formation 110 traversed by a borehole 112 and connected via an electrical cable 114 to a processing system (such as computer system 200 shown in FIG. 3) for processing signals transmitted uphole by the induction tool 100. The induction tool 100 includes a coil unit 116 comprising a transmitter coil 10 and a plurality of receivers 12, each receiver 12 can include a bucking coil 12b and receiver coil 12a, spaced apart from the transmitter coil and disposed along the tool 100. Persons of ordinary skill in the art will appreciate that the foregoing described tool is for illustrative purposes only, and that the method disclosed herein is useful with any induction tool. For example, an induction tool may have receivers placed on either side of the transmitter coil. Alternatively, an induction tool may have multiple transmitter coils spaced apart a distance from a single receiver. Tool 100 typically also includes an electronics unit 118 having a signal generator for generating alternating currents of select frequencies for transmission by the transmitter coil in the coil unit 116. Tool 100 typically also includes a signal processing and telemetry unit 120 for detecting voltages received by the receiver coils 12a in the coil unit 116 and for transmitting data to the borehole surface via electrical cable 114. While induction logging tool 100 will be discussed for the purposes of the description as conveyed on a wireline 114, it is understood by persons of ordinary skill in the art that the tool is not limited to wireline conveyance, but could likewise be conveyed on a slickline, or coiled tubing, or a drill string as part of logging while drilling or measurement while drilling procedures. To that end, in FIG. 2c, tool 100 is illustrated as being conveyed on a drillstring 115 having a bottom hole assembly 117 including a drill bit 119. Although tool 100 may be positioned anywhere along drillstring 115, in certain embodiments, tool 100 is positioned adjacent bottom hole assembly 117 or otherwise incorporated to form a part of bottom hole assembly 117.

FIG. 2a illustrates tool 100 disposed in a formation 110 having a plurality of layers 110a-110d which form an angle θ with the primary axis (z axis) of tool 100. Angle θ represents the relative dip between tool 100 and layers 110a-110d. In one embodiment, signals from a receiver array are processed to probe volumes of the formation 110 surrounding the borehole 112 differently, resulting in a multi-array induction log with a conductivity profile for the array which is substantially identical to that of an array in a thick bed, without relative dip or layering, which is illustrated in FIG. 2b.

Figure 3:
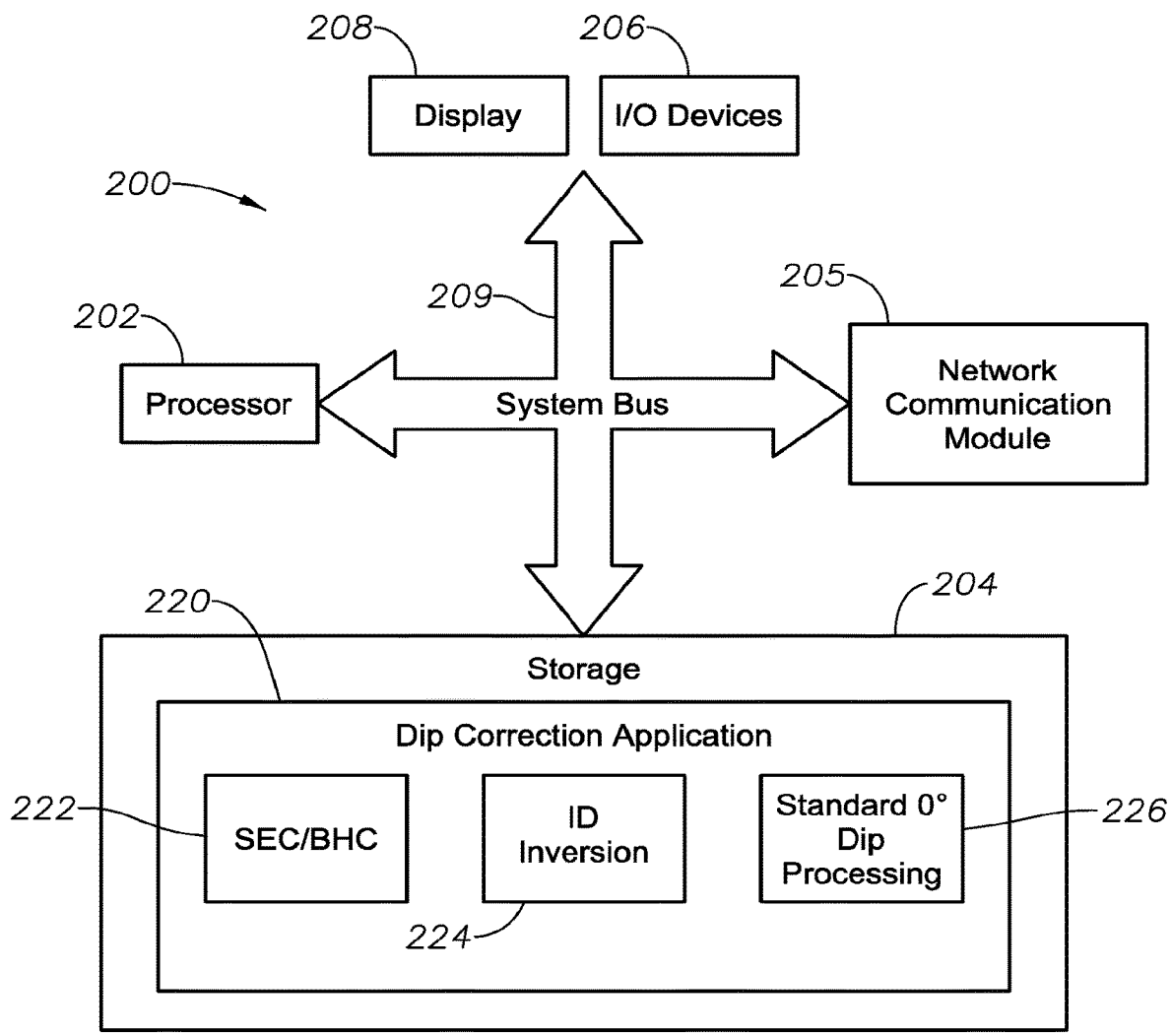
FIG. 3 is a block diagram of a computer system adapted for implementing a dip correction system of exemplary embodiments.

With reference to FIG. 3, there is shown a block diagram of an exemplary computer system 200 adapted for implementing the dip correction method. In one embodiment, the computer system 200 includes at least one processor 202, a non-transitory, computer-readable storage 204, an optional network communication module 205, optional I/O devices 206, and an optional display 208, and all interconnected via a system bus 209. To the extent a network communications module 205 is included, the network communication module 205 is operable to communicatively couple the computer system 200 to other devices over a network. In one embodiment, the network communication module 205 is a network interface card (NIC) and communicates using the Ethernet protocol. In other embodiments, the network communication module 205 may be another type of communication interface such as a fiber optic interface and may communicate using a number of different communication protocols. It is recognized that the computer system 200 may be connected to one or more public (e.g. the Internet) and/or private networks (not shown) via the network communication module 205. Such networks may include, for example, servers upon which raw and processed induction logging data, as well as other data needed for dip correction as described herein is stored. Software instructions executable by the processor 202 for implementing a dip correction application 220 in accordance with the exemplary embodiments described herein, may be stored in storage 204 or some other computer-readable medium. It will also be recognized that the software instructions comprising the dip correction application 220 may be loaded into storage 204 from a CD-ROM or other appropriate storage media.

Moreover, those skilled in the art will appreciate that the methods disclosed herein may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the methods disclosed herein. The methods disclosed herein may be practiced in distributed-computing environments where tasks are performed by remote-processing devices that are linked through a communications network. In a distributed-computing environment, program modules may be located in both local and remote computer-storage media including memory storage devices. The method disclosed herein may therefore, be implemented in connection with various hardware, software or a combination thereof in a computer system or other processing system. Moreover, the processing algorithm may be executed in the downhole environment or at the surface.

In certain exemplary embodiments, dip correction application 220 comprises a SEC and BHC data module 222, a 1D inversion module 224, and a standard 0° or no dip conductivity module 226. Dip correction application 220 is disposed to first execute SEC and BHC data module 222 and then introduce the results to 1D inversion module 224 to correct the data for dip, and finally, process the dip corrected data with module 226 using standard conductivity analysis that is configured for zero dip, as described in more detail below.

Figure 4:
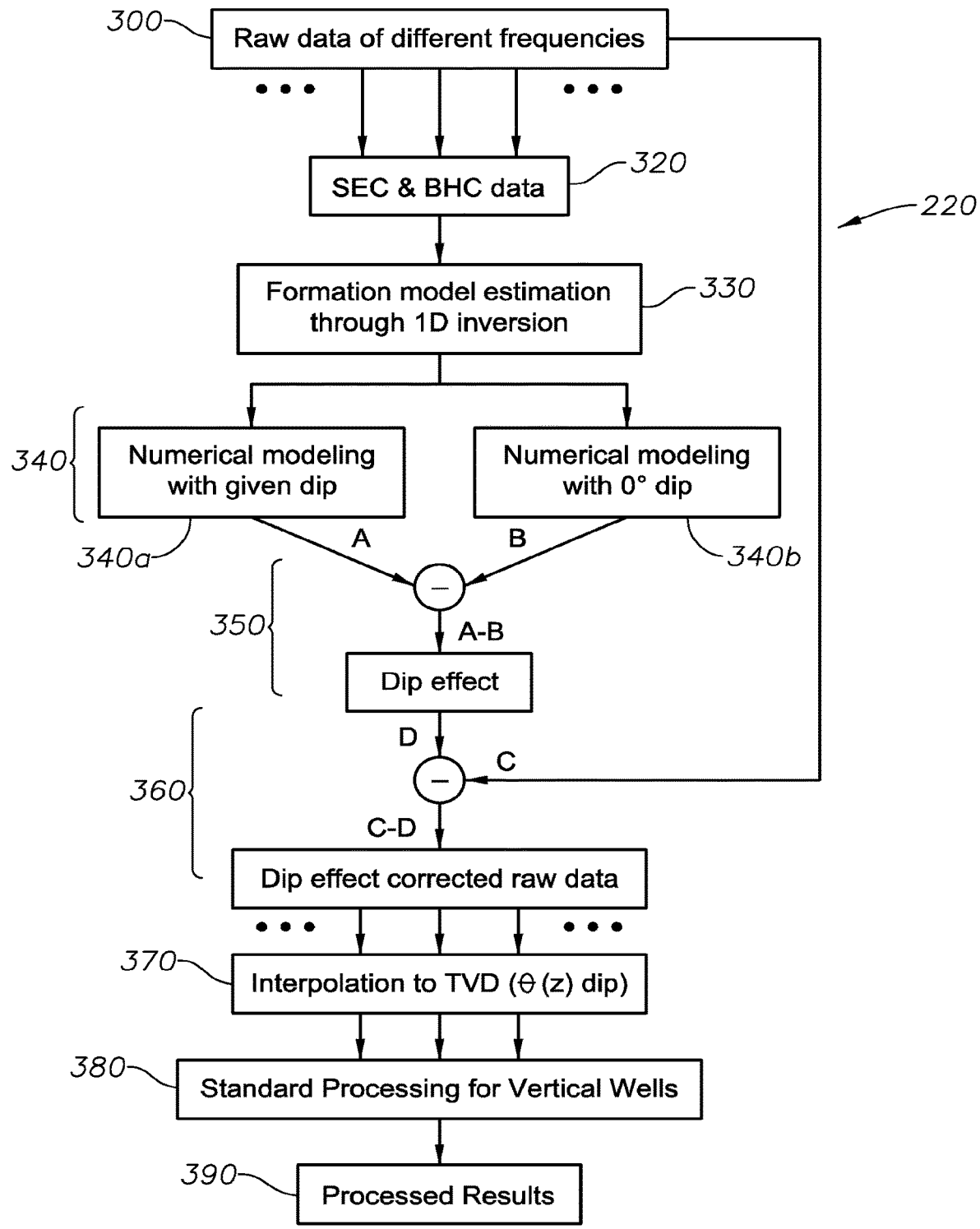
FIG. 4 illustrates a flowchart of exemplary embodiments of the dip correction method of the system.

With reference to FIG. 4, a flow diagram of one embodiment of the dip correction application 220 is illustrated. In step 300, an induction logging tool is utilized to collect raw data. The raw data can be collected over a range of frequencies, but in the least, at least two different frequencies. Although not intended as a limitation, in certain embodiments, frequencies typically range from 5 KHz to 250 KHz. Moreover, the raw data may be representative of an array of receivers spaced along the tool (e.g. tool 100).

The raw data collected in step 300 may consist of real and imaginary signals obtained at a multitude of frequencies, arrays and depths. In certain embodiments, as an intermediate step, the raw data of step 300 may be corrected for calibration and temperature before other processing steps, which yields the initial induction logging data.

As suggested above, it is desirable to correct induction logging data to remove certain signals that can affect the results of the logging data, particularly in deviated boreholes or dipping formations. More specifically, it is desirable to remove four different effects from the induction logging data: skin effect (due to conductive losses arising from the formation), borehole effect (due to presence of a resistive or conductive mud around the tool in the borehole), shoulder bed effect (due to influence of layer boundaries on the propagated signal) and dip effect. It has been found that dip effect can be masked by shoulder effect. By identifying and treating dip effect separately, more accurate results can be achieved. It is also understood that these effects can be removed without altering the measured invasion characteristics.

Figure 7:
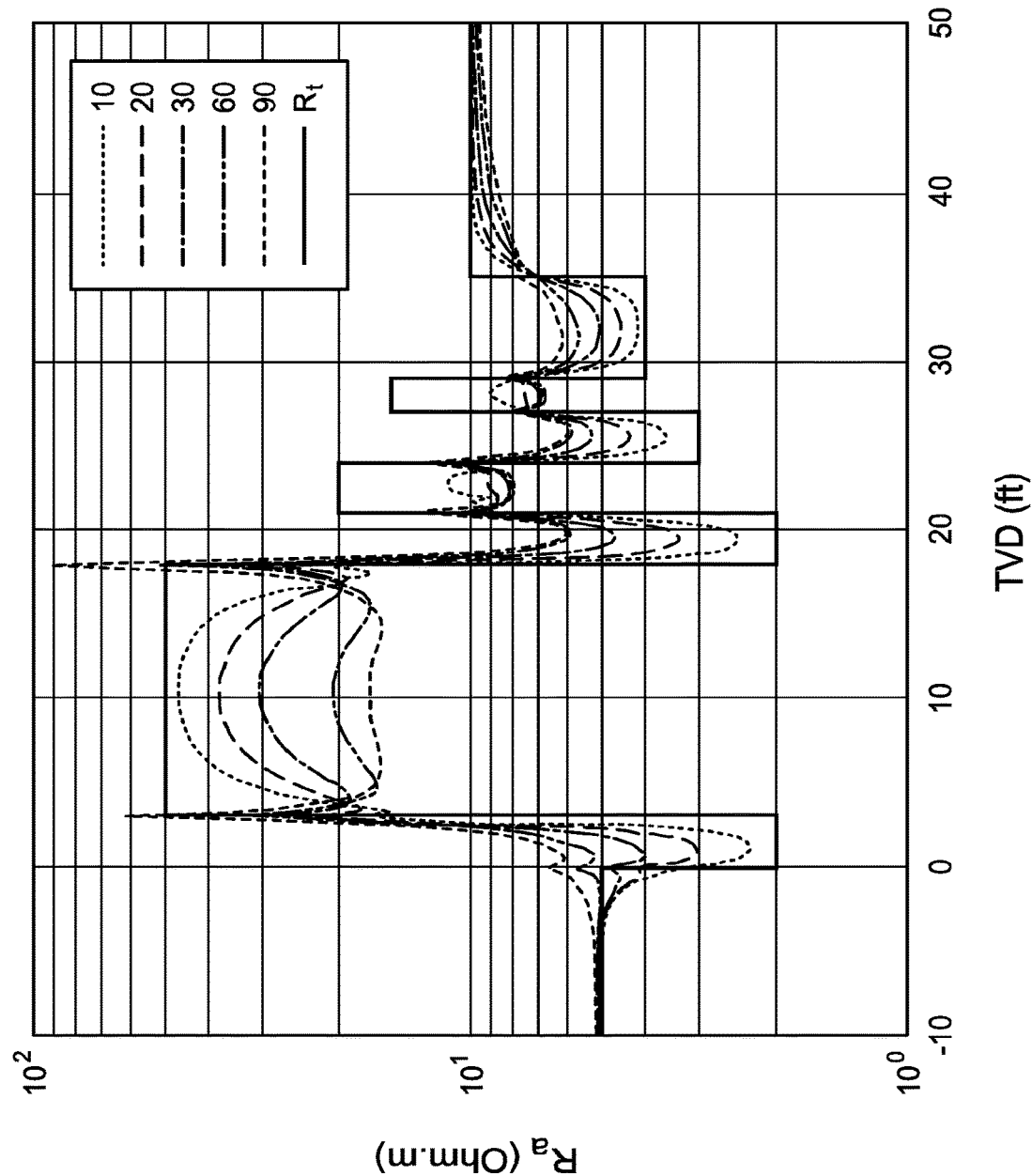
FIG. 7 illustrates the output of uncorrected array induction data where a relative dip of 75 degrees is reflected in the response.
Figure 8:
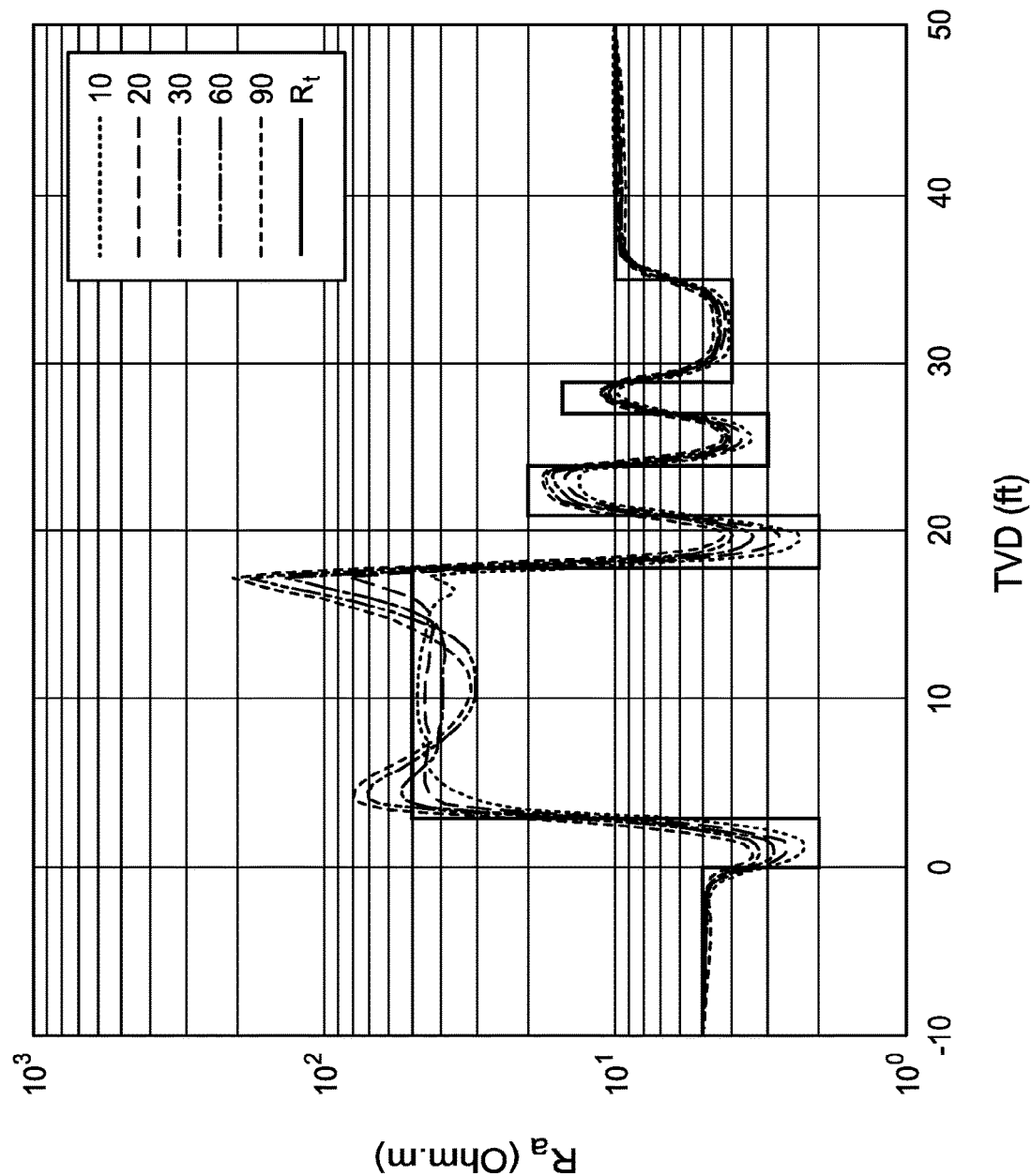
FIG. 8 illustrates the data of FIG. 7, but corrected for Type I effects.

With respect to dip effect, there are two types of dip effect. The first dip effect, which is referred to as type I, is associated with a sampling mismatch in the standard processing caused by dip. This effect occurs due to the fact that the standard array induction processing assumes a vertical borehole with True Vertical Depth ("TVD") step size, such as, for example, 0.25 ft. But the TVD distance between two adjacent measurement points is step size multiplied by cos ($\theta$), where $\theta$ is the dip angle. In the example, this would be $0.25 \times \cos(\theta)$, where $\theta$ is dip angle and 0.25 ft is the measured depth step size. Therefore, for $\theta=75°$, the TVD distance between two adjacent measurement points in the example becomes 0.0647 ft. Thus, dip angle effects the TVD utilized during processing. To further illustrated this, the case of $\theta=75°$ was simulated in a nine layer formation. The result of standard processing of this data with the array induction processing is shown in FIG. 7, where no dip effect corrections have been applied. In FIG. 7, it is evident that dip effect has a significant impact on measured resistivity ($R_a$) when compared to formation resistivity ($R_t$) for various depths of investigation. If the TVD step size is picked as 0.25 ft, which is the TVD step size that is assumed for the example, with everything else kept the same, the result of the processing is that shown in FIG. 8 where there is less separation between measured resistivity $R_a$ and formation resistivity $R_t$. The difference between FIG. 7 and FIG. 8 represent type I dip effect. This type of dip effect can be corrected easily by using interpolation to generate a sequence of data points separated by an adjusted TVD as described above.

The second type of dip effect, which is referred to as type II, is the real physical dip effect. This effect is caused by increased shoulder effect and bed boundary effects. To remove type II dip effect, an algorithm based on numerical inversion is utilized. The algorithm uses borehole corrected and skin effect corrected data in a 1D vertical inversion (V1D) scheme that relies on a 1D fast analytic forward modeling. Once the layers of the V1D inversion are found, the dip effect is evaluated synthetically and removed from the array induction logs.

Returning to the embodiment of the dip correction application 220 illustrated in FIG. 4, in step 320, the raw data is corrected for skin effect and borehole effect, resulting in SEC and BHC data. In certain embodiments, corrections for skin effect and/or borehole effect are separately processed. By separately correcting for each of these effects, the corrections can be limited to analysis in only the primary direction of correction, eliminating the need for analysis of higher order interactions that result between different effects when collectively analyzed. In other words, these higher order interactions can be eliminated from the analysis by separately addressing different effects, simplifying the process and minimizing computing requirements.

With respect to skin effect, the removal in some embodiments may combine multiple frequency data from each array. The combination of the multiple frequency data, which can be referred as multi-frequency processing, not only allows removal of the skin depth effect, but will improve the robustness of the subsequent dip correction. Multi-frequency processing is defined as a processing which has results that are sensitive to data from more than one frequency. It has been found that the skin effect can make numerical inversion (step 330) difficult to solve due to low signal level or uniqueness problems, especially when the tool is located in a zone of high conductivity. The use of multiple frequencies mitigates this problem because different frequencies are affected in different ways (with low frequencies being less affected by skin effect). On the other hand, higher frequencies are desirable in higher resistivity environments, because in those environments higher frequencies are associated with higher signal to noise ratios. For these reasons, by combining multiple frequency data in certain embodiments of step 320, the robustness of the subsequent inversion can be improved. It is also true that by using the multiple frequency data, the reliability of the overall dip correction method can be improved, because by monitoring the integrity of the different frequencies, poor quality frequency data can be removed from the process and acceptable results can still be obtained with a reduced number of frequencies. Output of the skin effect correction data has its frequency dimension removed and hence has one less dimension compared to the input data. Typically, it is a function of array and depth.

With respect to removal of borehole effect, this is carried out in a manner well known in the field. In certain embodiments, inversion with a concentric 2-layer model is conducted either by utilizing a look-up table or an iterative method with either known or unknown borehole diameter and mud resistivity. The look-up table can be based on the range of possible mud resistivities, formation resistivities and borehole diameters. Output of the borehole correction data typically has the same dimensions with the input data.

In step 330, following skin effect correction and borehole effect correction, type II dip effect correction is applied. Specifically, a 1D inversion using the SEC and BHC data is performed in order to model the formation. Thus, SEC and BHC occurs prior to 1D inversion. In any event, 1D inversion is an optimization problem where real and/or imaginary results from a 1D model are compared to optimally match to real and/or imaginary measurement results. The output of the inversion is a set of layer resistivities and layer positions that are used as input parameters to the 1D model. As used herein, "1D model" denotes use of an algorithm that produces simulated signal response of the tool for a given 1D resistivity model. Here "1D resistivity model" refers to the single direction in which the resistivity of a model is varying. For example, a 1D model is a model where the layers are planar and parallel to each other. The dimensions are traditionally considered to be in the cylindrical domain, since a borehole is locally and approximately cylindrical. As a result, it is possible to consider resistivity variations in multiple directions which yield different algorithms. For example, a variation in vertical direction can be called vertical 1D (V1D). As another example, a variation in the radial direction can be called radial 1D (R1D). It is possible to consider 2D and 3D inversions, or 2D and 3D models as a straightforward extension of the definitions above. A definition of 0D can also be made similarly by considering a single layer (non-varying) homogeneous resistivity model. To the extent SEC data has been corrected utilizing combined frequencies, step 330 likewise is performed on the combined frequency results from each array and a depth range. The depth range is chosen large enough to cover the layers whose properties are being inverted along with any other layer that may affect the inversion of those layers. The depth range is chosen small enough to minimize number of layers in the 1D model and associated computational cost.

In step 330, relative dip between the borehole and formation layer may or may not be provided. Since an array induction tool is not a dip meter, it is preferable that relative dip be provided by some other means known in the art. Of course, those of ordinary skill in the art will appreciate that it is possible to solve for relative dip in cases where it is not provided by solving an optimization problem to minimize variations in the inverted formation parameters or minimize misfit in the 1D inversion, but in such cases the quality of the inversion in that case may not be optimal, especially in cases with invasion effects. Thus relative dip may be determined through measurement or mathematically. In addition, 1D inversion is performed using data that has been skin effect corrected and borehole effect corrected. In any event, in certain embodiments, it may be assumed that the formation is a layered anisotropic formation, but in such case, the characteristics of the anisotropy (such as anisotropy ratio) should be provided, such as, for example, from a resistivity anisotropy measurement tool or based on petrophysical and geophysical expectations from an offset well. (In the examples of FIGS. 7-11, an isotropic formation is assumed.)

Once the 1D inversion has been performed and the inverted formation parameters such as layer resistivities and layer positions have been found, in step 340, the effect of relative dip on the logs is computed for each array by modeling with the inverted formation parameters. The model in step 340 may be chosen as vertical 1D for efficiency in computation, however, in certain preferred embodiments, both vertical and radial layers may be incorporated, making the modeling 2D or 3D. As shown, in step 340a, forward modeling is performed utilizing a select relative dip angle, while in step 340b, forward modeling is performed utilizing a zero degree (0°) relative dip.

Utilizing the results of steps 340a and 340b, in step 350, the dip effect correction for type II is determined. In step 360, the raw data from step 300 is corrected utilizing the type II dip effect determined in step 350, and thereby yielding type II dip effect corrected data.

In the methodology described above, θ=0 degrees relative dip is taken as the reference, which means that the results with the relative dip is corrected to obtain results equivalent to those that would be obtained in the θ=0 degrees relative dip case. However, it should be noted that any relative dip other than θ=0 degrees can also be used as reference. In such case, however, all θ=0 degrees relative dips in the models need to be replaced by the desired reference dip.

In one embodiment of steps 350 and 360, as illustrated in FIG. 4, the dip effect correction is evaluated as an additive factor. In such case the results of steps 340a and 340b can simply be subtracted from one another to determine the dip effect.

In another embodiment of steps 350 and 360, the dip effect correction may be treated as a multiplicative correction factor. In such case, the results of steps 340a and 340b may be multiplied or divided to determine the dip effect correction utilizing a ratio. For example, the following multiplicative correction factor may be applied: (B/A×C), where A is the result of step 340a, B is the result of step 340b, and C is the raw data.

Next, in step 370, the type II dip effect corrected data can be interpolated to correct for type I dip effect described above. An appropriate step size is selected and utilized in conjunction with a selected dip angle θ to yield a TVD adjusted for dip angle. In other words, the raw data of step 300 has been corrected to remove the effects of dip on the raw data so that the raw data can be treated as if it were acquired in a formation of zero relative dip (or from a non-deviated borehole), i.e., where θ=0 degrees. Although, in FIG. 4, type I dip effect correction is performed after type II dip effect correction, type I dip effect correction can also be performed before type II dip effect correction or in parallel therewith.

Thereafter, in step 380, data that has been corrected for both type I and type II dip effects is utilized with standard processing techniques designed for wells with no relative dip, which are typically vertical wells. The resulting dip effect corrected data can be used with any standard no relative dip well processing methods for non-dipping formation logs. The standard processing methods may produce focused resistivities which are regulated in vertical resolution and depth of investigation.

An additional benefit of the method described herein is that inverted formation parameters, which are the output of the 1D inversion process 330, can be visualized (by graphically presenting, such as on a display 208 or an output device 206) for quality control.

Similarly, the inverted formation parameters can be further processed by a radial inversion algorithm to generate an invasion profile or to generate different depth of investigation curves. These curves can then be graphically presented in order to compare the curves to standard processing curves for additional quality control.

Figure 5:
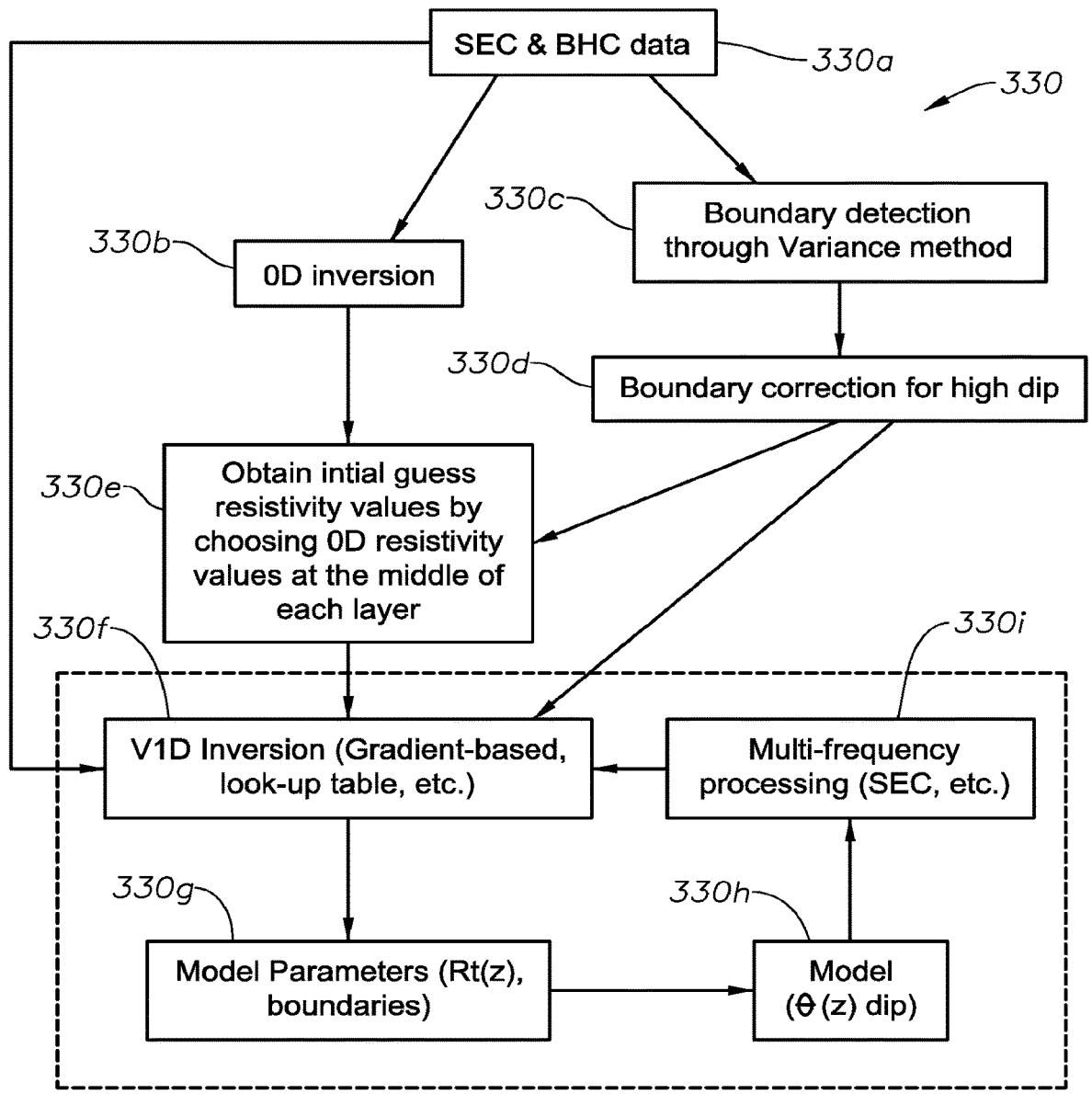
FIG. 5 illustrates one embodiment of the 1D inversion process utilized.
Figure 6A:
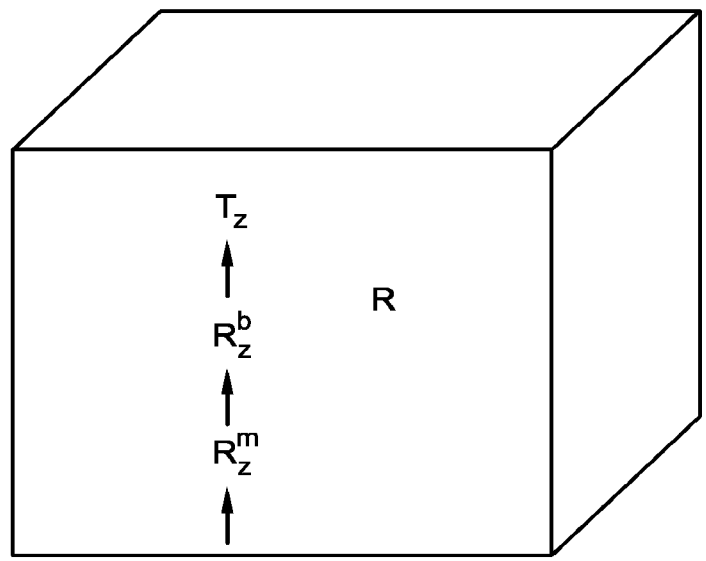
FIG. 6a illustrates a formation with a homogenous, single layer (non-varying) across the area of investigation.
Figure 6B:
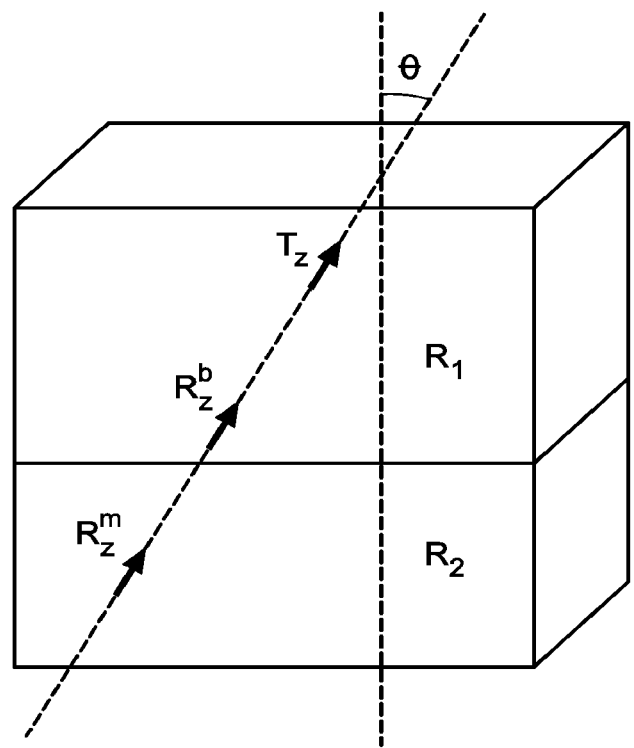
FIG. 6b illustrates a formation with variations across the area of investigation.

With reference to FIG. 5, one embodiment of step 330 is illustrated in more particularity. In step 330a, the SEC and BHC data is utilized as input for the 1D inversion process. Inversion processes start with initial guesses for boundary positions and resistivity values in each layer. The better initial guesses result in fewer inversion iterations. If initial guesses are not close enough to the real values, inversion takes more time and might not even invert successfully to the real values in some cases. In this regard, it is desirable to use the best possible initial guess for boundaries and resistivity values in each layer. In step 330b, a 0D inversion is applied to the SEC and BHC data to yield 0D formation resistivity values at the measurement points. In this step, the formation is treated as if there is only one layer, as is illustrated in the formation shown in FIG. 6a, in order to pick initial resistivity values. On the other hand, for V1D inversion, for which a formation such as is shown in FIG. 6b is assumed, there are several layers with resistivities and boundary positions unknown in each layer.

In step 330c, boundary detection is performed using the SEC and BHC data, thereby yielding initial boundary positions. The method of step 330c is not limited to a particular boundary detection method, but in the illustrated embodiment, the variance method is applied. However, persons of ordinary skill in the art will understand that any boundary detection method can also be used. In step 330d, the boundary positions resulting from step 330c are adjusted in order to compensate the estimated boundary positions for dip effect. Thus, initial guess values for boundaries are determined in steps 330c and 330d.

In step 330e, the 0D formation resistivity values determined in step 330b are adjusted using the dip corrected boundaries determined in step 330d. Step 330e, therefore, yields an initial resistivity guess for V1D inversion step 330f. In step 330e, the initial guess is taken from the 0D inversion apparent resistivity values at the center of the beds, where the boundaries are the output of step 330d. Thus, the function of 0D inversion in this embodiment of the overall process of step 330 is to yield a much better V1D initial resistivity guess. In certain embodiments, steps 330b, 330c and 330d may be unnecessary.

In step 330f, V1D inversion is initiated. The process of step 330f utilizes as input the SEC and BHC data, along with the initial resistivity values determined in step 330e and the initial boundaries determined in step 330d. V1D inversion may be performed using any known inversion technique. In certain embodiments, such inversion techniques include, but are not limited to, utilizing a pre-tabulated look-up table or a search algorithm, such as, for example, Gradient base methods. In any event, V1D inversion as utilized herein is an optimization problem where real and/or imaginary results from a V1D model are compared to optimally match to real and/or imaginary measurement results. In step 330g, based on the inversion initiated in step 330f, a set of input parameters for the V1D model are generated. The parameters of step 330g include layer resistivities and boundary positions between layers. In step 330h, forward modeling code runs for varying frequencies and the parameters obtained in step 330g are also being input to the forward model.

As indicated by the dashed box, the process may be iterated using data from multi-frequencies in order to refine the model of step 330h. Since the input is SEC and BHC data and the SEC and BHC data is optimized, at each iteration step (330f-330g-330h-330i), the inverted model parameters (330g), which is the result of that iteration, are processed with a forward modeling code with varying frequencies (330h) and then processed with SEC (330i).

In any event, following refinement by iteration as described above, the output of the overall V1D inversion, step 330g, is used to correct for the dip effect as described in steps 340-360 of FIG. 4.

Persons of ordinary skill in the art will further appreciate that the output of 1D inversion can also be used to refine SEC (skin effect correction) and BHC (borehole correction) data. Specifically, skin and/or borehole effect in the raw data can be corrected based on the values at the centers of the layers recovered in the 1D inversion. This can allow better correction with less influence due to shoulder effects. This corrected SEC and BHC data can then be utilized in the various steps of process 220, such as for example, steps 330i and 380, to further refine results.

Figure 9:
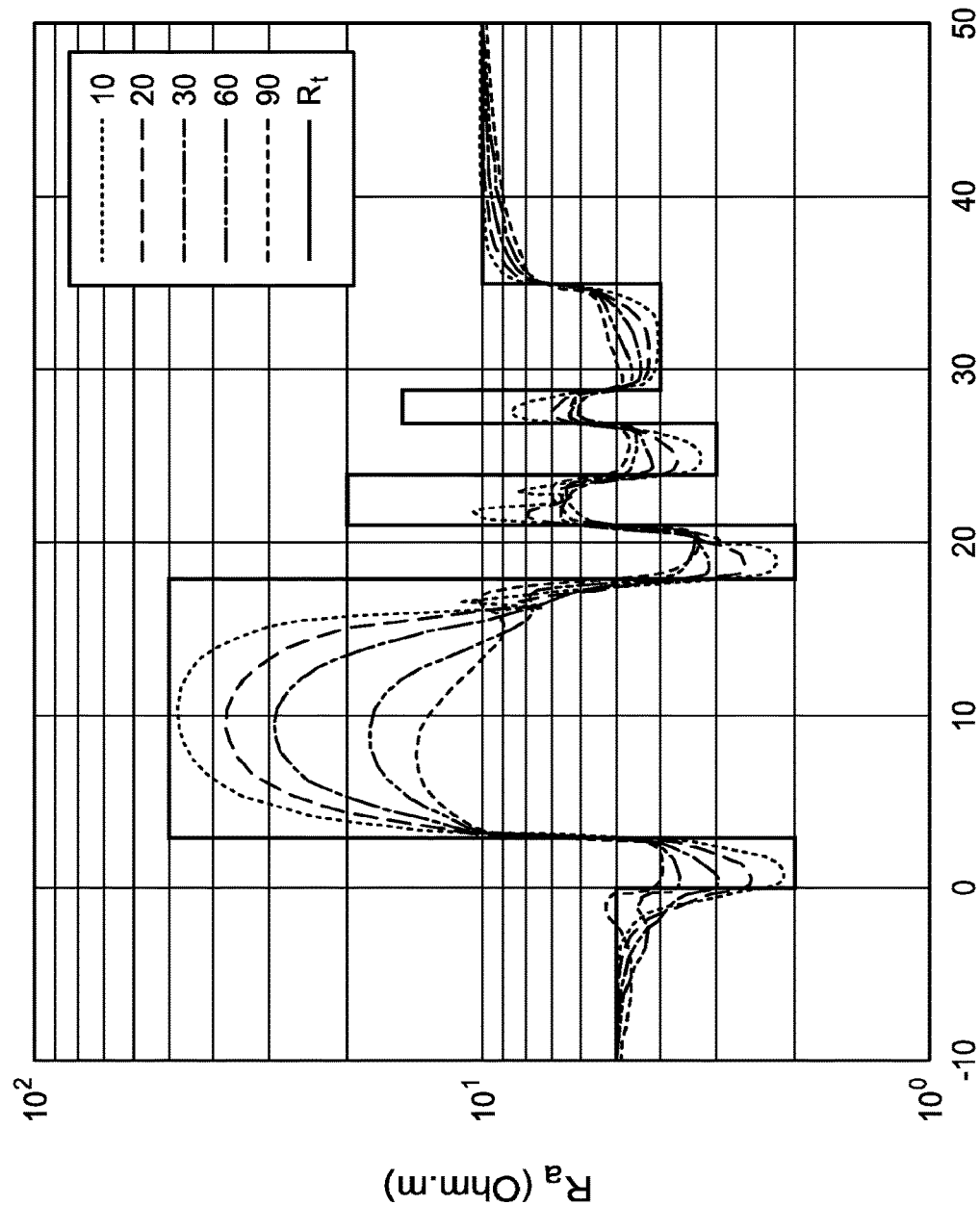
FIG. 9 illustrates the data of FIG. 7, but corrected for Type II effects.

Turning now to FIGS. 7-11, a synthetic example of dip correction is presented. In the example, a simple 9 layer zone with relative dip of 75 degrees is used in the formation model. In FIG. 7, the output of the uncorrected array induction data is presented, where a relative dip of 75 degrees is reflected in the response. In the example, actual impedance $R_a$ at the following depths of investigation (in inches) are displayed: 10, 20, 30, 60 and 90. $R_t$ represents the formation resistivity. Persons of ordinary skill in the art will appreciate that curve separation such as is reflected in FIG. 7 is often indicative of an invasion zone with different resistivity values for the different arrays of the tool. However, it has been observed that curve separation can also result from dip. Thus, where dip is present, before meaningful invasion analysis, the data should be dip corrected. In FIG. 7, the effect of dip in this case creates significant curve separation. In FIG. 7, TVD step size is 0.25×cos (75), which yields TVD=0.0647 ft. If the TVD step size is picked as 0.25 ft, which is the TVD step size that standard processing code assumes, with everything else is kept the same, the result of the processing is that shown in FIG. 8. The difference between FIG. 7 and FIG. 8 represents type I dip effect. The difference between FIG. 7 and FIG. 9 represent type II dip effect. FIG. 9 is the case of no dip but the TVD size is 0.0647 ft. If it is corrected for the 'type 1 effect', it will become FIG. 10.

Figure 10:
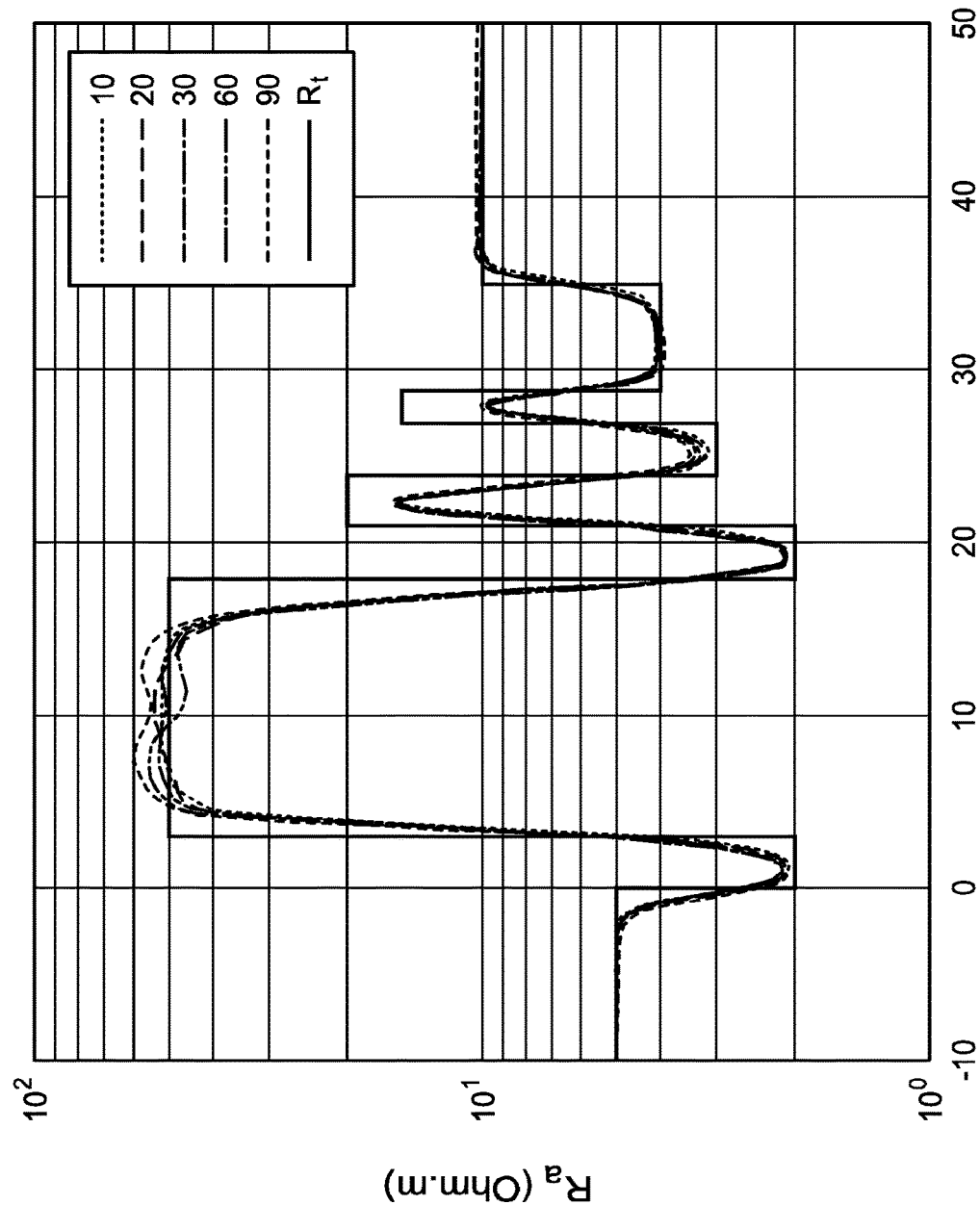
FIG. 10 illustrates the data of FIG. 7, but corrected for both Type 1 and Type 11 effects.
Figure 11:
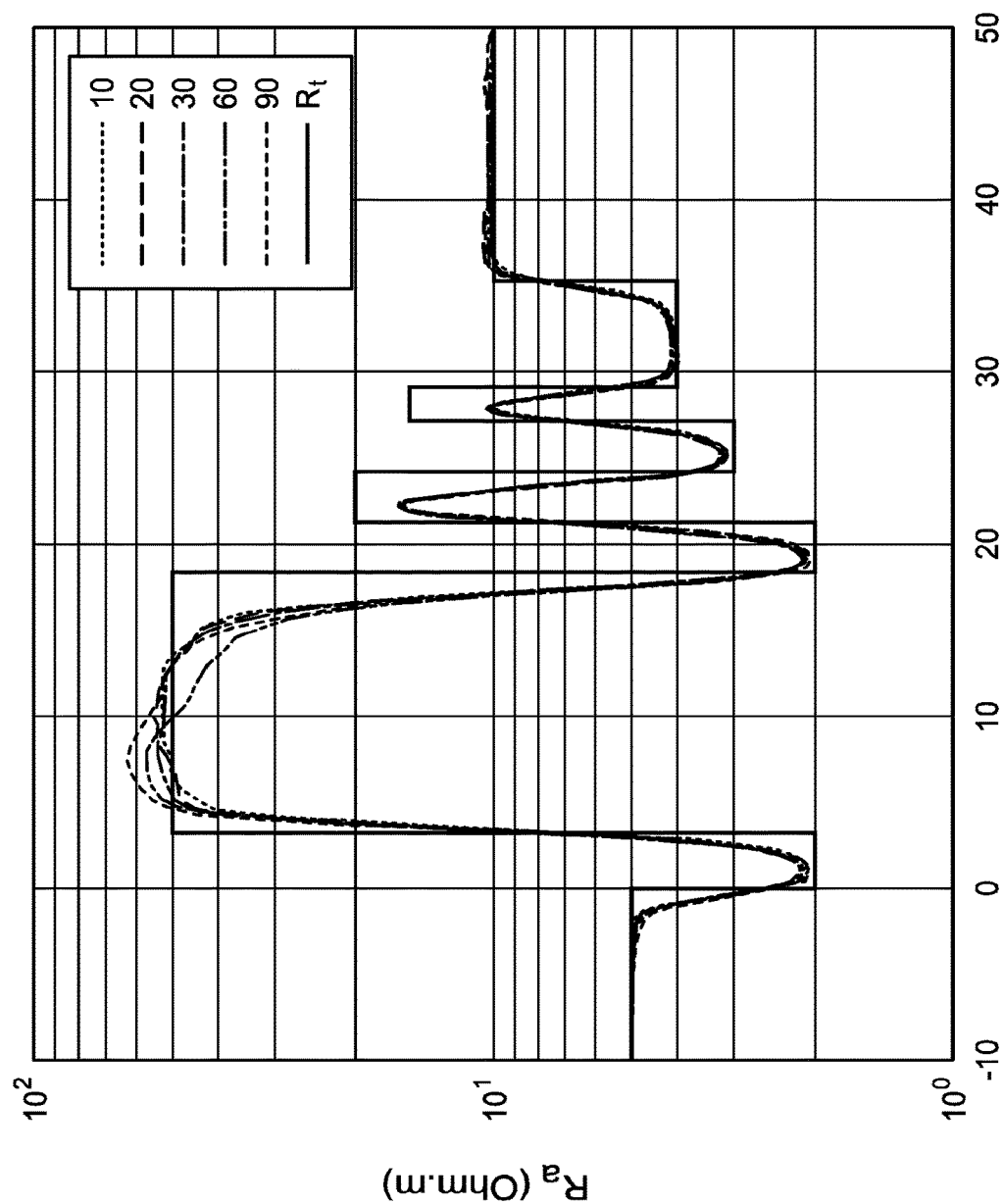
FIG. 11 illustrates the output of array induction data where no relative dip is present.

In FIG. 10, the raw data utilized to generate FIG. 7 has been dip corrected utilizing the method disclosed herein. As illustrated by comparing FIGS. 10 and 11, the dip corrected results, i.e., induction logs where raw data has been corrected for dip using the method, demonstrate that the separation of curves is similar to the zero degree relative dip, thereby validating the effectiveness of the dip correction method.

Thus, as is evident from FIGS. 7-11, if dip correction is not performed, the processed resistivity curves can be misleading and result in misinterpretation of curves by misrepresenting invasion zones. Failure to properly identify invasion zones can lead to misplacement of wellbores and/or misplacement of perforations to maximize hydrocarbon recovery. The dip correction method disclosed herein is desirable because it utilizes skin effect corrected data for the inversion. Because skin effect corrected data is frequency independent, the output of the inversion is therefore more robust than traditional inversion methods.

In this regard, the foregoing methods and systems described herein are particularly useful in drilling wellbores and recovery of hydrocarbons where relative dip between the wellbore and one or more formation layers is anticipated. First a formation is modeled as described herein to design a well completion plan for a well. In certain embodiments, the well completion plan may include selecting a particular trajectory of a wellbore in the formation and drilling the wellbore based on the formation model resulting from the method disclosed herein. In another embodiment, well completion may include selection of a fracturing plan, which may include the selection of fracture zones and their positioning, fracturing fluids, proppants and fracturing pressures. In another embodiment, well completion may include casing a wellbore and thereafter perforating the cased wellbore based on the results of the modeling disclosed herein.

While certain features and embodiments have been described in detail herein, it will be readily understood that the disclosure encompasses all modifications and enhancements within the scope and spirit of the following claims. Furthermore, no limitations are intended in the details of construction or design herein shown, other than as described in the claims below. Moreover, those skilled in the art will appreciate that description of various components as being oriented vertically or horizontally are not intended as limitations, but are provided for the convenience of description.

It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed:

1. A method for making geophysical measurements within an earth formation, the method comprising:
   deploying an induction logging tool in a borehole within the earth formation, an axis of the borehole having an inclination angle relative to one or more layer boundaries in the earth formation, the tool comprising:
      at least one transmitter configured to transmit electromagnetic signals at select frequencies into the earthen formation; and
      at least one receiver array configured to collect electromagnetic signals from the earthen formation;
   utilizing the induction logging tool to collect initial induction logging data over two or more frequencies;
   actuating a computer to:
      apply at least one multi-frequency skin effect or borehole effect correction to the induction logging data to obtain processed induction logging data;
      perform a 1D inversion on the processed induction logging data to determine a dip effect correction, the 1D inversion yielding inverted formation parameters, wherein performing the 1D inversion comprises:
         modeling the inverted formation parameters utilizing zero degree relative dip;
         modeling the inverted formation parameters utilizing a predetermined relative dip; and
         determining a dip effect correction by:
            dividing results of the modeling into one another; or
            subtracting results of the modeling from one another;
      apply the dip effect correction to the initial induction logging data in order to yield induction logging data that is dip corrected; and
      evaluating the earth formation using the induction logging data,
      wherein performing the 1D inversion further comprises:
         utilizing the processed induction logging data to perform 0D inversion to yield initial resistivity values;
         estimating initial boundary positions for one or more boundaries in the formation;
         correcting the boundary estimates to compensate for dip;
         adjusting the initial resistivity values based on the corrected boundary estimates; and
         utilizing the processed induction logging data, the corrected boundary estimates and the adjusted initial resistivities to perform the 1D inversion;
   identifying zones in the earth formation using the dip corrected induction logging data; and
   drilling or completing a wellbore to recover hydrocarbons along the identified zones of the earth formation.

2. The method of claim 1, wherein performing the 1D inversion comprises utilizing an additive correction for the dip effect correction.

3. The method of claim 1, wherein performing the 1D inversion comprises utilizing a multiplicative correction for the dip effect correction.

4. The method of claim 1, further comprising actuating the computer to utilize the dip corrected induction logging data to determine resistivities of at least two layers in a formation.

5. The method of claim 4, wherein determining resistivities comprises utilizing a method that assumes the borehole axis is substantially perpendicular to the layer boundaries in an earth formation.

6. The method of claim 4, wherein performing inversion yields a resistivity for the formation.

7. The method of claim 6, further comprising actuating the computer to conduct quality control on the process by comparing the resistivity of the formation to the resistivities of the layers.

8. The method of claim 1, wherein the initial induction logging data is collected utilizing an array of at least two receiver coils spaced apart from a transmitter two different distances.

9. The method of claim 8, where the initial induction logging data is collected at three or more frequencies.

10. The method of claim 1, further comprising actuating the computer to display the dip corrected induction logging data as induction logging curves at a plurality of depths of investigation.

11. A system for making geophysical measurements in a borehole with a borehole axis having an inclination angle relative to one or more boundaries in an earth formation, the system comprising:
   an induction logging tool to collect initial induction logging data over two or more frequencies from a formation at a predetermined borehole depth, the tool having at least one transmitter and at least one receiver array; and a computing device programmed to:
apply at least one multi-frequency skin effect or borehole effect correction to the initial induction logging data, which produces processed induction logging data;
perform a 1D inversion on the processed induction logging data to determine a dip effect correction, the 1D inversion yielding inverted formation parameters, wherein performing the 1D inversion comprises:
modeling the inverted formation parameters utilizing zero degree relative dip;
modeling the inverted formation parameters utilizing a predetermined relative dip; and
determining a dip effect correction by:
dividing results of the modeling into one another; or
subtracting results of the modeling from one another;
apply the dip effect correction to the initial induction logging data in order to yield induction logging data that is dip corrected; and
evaluate the earth formation using the induction logging data,
wherein performing the 1D inversion further comprises:
utilizing the processed induction logging data to perform OD inversion to yield initial resistivity values;
estimating initial boundary positions for one or more boundaries in the formation;
correcting the boundary estimates to compensate for dip;
adjusting the initial resistivity values based on the corrected boundary estimates;
utilizing the processed induction logging data, the corrected boundary estimates and the adjusted initial resistivities to perform the 1D inversion;

identifying zones in the earth formation using the dip corrected induction logging data; and
drilling or completing a wellbore to recover hydrocarbons along the identified zones of the earth formation.

12. The system of claim 11, wherein the receiver array comprises a plurality of receivers, each comprised of a receiver coil and associated bucking coil, each receiver set spaced apart from one another along a primary axis of the logging tool.

13. The system of claim 12, wherein the initial induction logging data comprises data collected by a plurality of receivers,
wherein the application of multi-frequency correction comprises correcting the initial induction logging data for skin effect,
wherein performing inversion yields inverted formation parameters,
wherein performing inversion further comprises:
modeling the formation utilizing zero degree relative dip, thereby producing a first formation model,
modeling the formation utilizing a predetermined dip, thereby producing a second formation model, and
manipulating the first and second formation models relative to one another to yield a dip effect correction.

14. The system of claim 13, wherein manipulating comprises dividing the first and second formation models into one another to yield a dip effect correction.

15. The system of any one of claims 11 to 14, wherein the computing device comprises:
a processor and a non-transitory storage medium accessible by the processor; and
dip correction software instructions stored on the storage medium and executable by the processor to apply at least one multi-frequency skin effect or borehole effect correction, perform the inversion, and apply the dip effect correction.

* * * * *